(12) United States Patent
Green

(10) Patent No.: US 6,204,850 B1
(45) Date of Patent: Mar. 20, 2001

(54) SCALEABLE CAMERA MODEL FOR THE NAVIGATION AND DISPLAY OF INFORMATION STRUCTURES USING NESTED, BOUNDED 3D COORDINATE SPACES

(76) Inventor: Daniel R. Green, 2340 Francisco St. #301, San Francisco, CA (US) 94123

( * ) Notice: Subject to any disclaimer, the term of this patent is extended or adjusted under 35 U.S.C. 154(b) by 0 days.

(21) Appl. No.: 09/057,105

(22) Filed: Apr. 7, 1998

Related U.S. Application Data

(60) Provisional application No. 60/048,150, filed on May 30, 1997.

(51) Int. Cl.$^7$ .................................. G06F 3/00; G06F 13/00
(52) U.S. Cl. ........................ 345/357; 345/355; 345/356; 345/438
(58) Field of Search ................................ 345/355, 356, 345/357, 358, 427, 419, 438

(56) References Cited

U.S. PATENT DOCUMENTS

| | | | |
|---|---|---|---|
| 5,929,853 | * | 11/1999 | Guha ..................................... 345/428 |
| 5,995,106 | * | 11/1999 | Naughton ............................. 345/357 |
| 6,057,843 | * | 5/2000 | Van Overveld et al. ............ 345/355 |

OTHER PUBLICATIONS

Bederson, B.B., Stead, L. and Hollan, J.D., "Pad++: Advances in Multiscale Interfaces", *Proceedings of ACM SIGCHI 1994*, short paper category.

Bederson, B.B. and Hollan, J.D., "Pad++: A Zoomable Graphical Interface System", *Proceedings of ACM UIST*, 1994.

(List continued on next page.)

*Primary Examiner*—Mark Zimmerman
*Assistant Examiner*—Philip Stevenson
(74) *Attorney, Agent, or Firm*—Fenwick & West LLP

(57) ABSTRACT

A computer implemented system and method provide navigation of information structures through corresponding graphical structures containing graphical nodes. Each graphical node has its own bounded volume defined in a relative 3D coordinate space. Each graphical node further may have a parent or child containment relationship with any other arbitrary graphical node. The containment relationships correspond to semantic containment relationships of corresponding information nodes in an information structure. As a result, the various 3D coordinate spaces are arbitrarily nested within each other, yet provide for a fully defined local coordinate frame of reference for contained objects. A viewer module manages a view volume in the coordinate space of a current one of the graphical nodes and associated current coordinate space. As the user moves a viewpoint in the current coordinate space, the view volume is dynamically rescaled in inverse proportion to the depth of the viewpoint in that space. The viewer module then dynamically selects for display only those child graphical nodes that have coordinate extents intersecting the rescaled view volume. The viewer module further allows navigation of the viewpoint from the coordinate space of a parent graphical node into the coordinate space of any of its child graphical nodes, representing a narrowing of a semantic scope within the information structure, and the reverse representing a broadening of semantic scope. A rate of change in the location of the viewpoint in the current coordinate space may be made proportional to the distance of the viewpoint from the rear plane of that bounded volume, preventing the viewpoint from ever reaching the rear plane, and providing a sensation of travel within a space of infinite depth.

21 Claims, 13 Drawing Sheets

OTHER PUBLICATIONS

Furnas, G.W. and Bederson, B.B., "Space–Scale Diagrams: Understanding Multiscale Interfaces", *ACM SIGCHI*, 1995.

Meyer, J., Perlin, K., Bederson, B.B. and Hollan, J.D., "Two Document Visualization Techniques for Zoomable Interfaces", Unpublished, http://hci.ucsd.edu/papers/unpub–95–docvis/index.htm.

Perlin, K. and Fox, D., "Pad An Alternative Approach to the Computer Interface", *Proceedings of ACM SIGGRAPH*, 1993.

* cited by examiner

SCALEABLE CAMERA MODEL FOR THE NAVIGATION AND DISPLAY OF INFORMATION STRUCTURES USING NESTED, BOUNDED 3D COORDINATE SPACES

RELATED APPLICATION

This application is a continuation of provisional application Ser. No. 60/048,150 filed on May 30, 1997 titled "Immersive Movement-Based Interaction with Large Complex Information Structures."

BACKGROUND

1. Field of Invention

The present invention relates generally to information display and navigation techniques, and more particularly, to the display of, and navigation through, arbitrarily graph-structured information spaces.

2. Background of the Invention

Computer systems are particularly useful for storing and searching large bodies of information. The information in such collections is typically arranged hierarchically in order to capture various types of relationships between items of information, and to organize the information into various classes, categories, and the like. Given a hierarchical arrangement of the information, it is conventional to display the information using various hierarchical representations.

FIG. 1 illustrates a conventional display of a hierarchical listing of items, here a screen shot showing Microsoft Corp.'s Explorer software application from the Windows95 operating system. Explorer uses a hierarchical outline as the visual interface for displaying and navigating the hierarchical relationship of files in a file system. Similarly, many word processors provide an outline mode to display the hierarchical structure within a document. Hierarchical outline displays are useful for small, well-understood hierarchies, but become difficult and tedious to navigate for large, deep hierarchies. This is because larger hierarchies either have numerous levels of categorization (i.e. deep hierarchies), which requires the user to navigate down through many different levels to a specific item, or have fewer levels (i.e. shallow hierarchies) but many items per level, requiring the user to review the numerous items at each level.

An alternate method for displaying hierarchies is to model and display the hierarchical relationships between information items as self similar branches of decreasing scale in a single absolute coordinate system with two or more dimensions. Display and navigation techniques in these systems then allow users to magnify and expand regions of interest to both visualize overall structure and to find data objects of interest. This type of multi-resolution visualization can be seen as either the ability to manipulate and scale the data structure, or as the ability to translate and scale one's point of view. Both are equally valid and equivalent ways of looking at the same operations.

Pad and Pad++ by Kenneth Perlin of New York University are examples of systems using this technique in two dimensions. Graphical data can be scaled to any size and placed anywhere within a continuous 2D surface, and multiple surfaces may be used, and windows or portals onto the surfaces may be arbitrarily placed. The user can expand, contract, and pan around to view any part of the surface at any scale. While Pad and Pad++ can represent hierarchical information structures, they do so only within continuous 2D surfaces by embedding and shrinking nested surface regions within one another. This limitation to representations and organizations of information to flat surfaces fails to graphically capture the rich variety of semantic relationships that items of information may have with one another.

One of the most significant problems with modeling hierarchies in absolute coordinates is the difficulty of maintenance. For any object to be placed in a hierarchy, a graphical representation of the object must be assigned coordinates placing it rigidly within the coordinate system. By analogy this is the equivalent of modeling a house brick by brick. Instead of simply stating where the house is to be placed, one must determine where every brick goes. This rigidity also makes it difficult to alter hierarchies once they have been created. Continuing the analogy: just as moving the house would require specifying a new location for each brick, altering the hierarchy would require specifying a new location for each object.

Another problem with absolute coordinate spaces is numerical resolution. While it is mathematically simple to think of a system that allows absolute coordinates to be computed within a hierarchy, in order to be used on a typical computer, those coordinate values must be stored with some finite precision. As the number of levels in a hierarchy grow beyond even a moderate number, even double precision numbers quickly run out of resolution to adequately represent numbers at very different scales, and thus very complex hierarchies. While there are methods for storing numbers with arbitrary precision within computers, the cost in additional memory and especially in processing time is usually prohibitive, and may impair real-time navigation within the hierarchy.

As an alternative to absolute coordinate systems, relative coordinate systems have been used for modeling hierarchies of graphical objects, for example in computer animation and computer aided design. Relative coordinate modeling means describing each graphical object in its own coordinate system and then using or "instancing" them wherever they are needed in the overall graphical structure. At display time, each instance of an object takes its scale, position and possibly other attributes from its parent. This approach provides flexibility since moving or reparenting a node simply involves moving or transforming a link. The results of such changes are only observed at display time. Using the house analogy, this approach is like moving a house by simply changing its address instead of moving it brick-by-brick.

The use of relative coordinates also solves the problem of numerical resolution. Each object can be modeled using the full range of numerical resolution. It is only when extremely large and small objects must be rendered in the same coordinate system that numerical problems creep back in. Usually, there is sufficient resolution available in traditional single and double precision numbers to have the added luxury of modeling each object in terms of the most natural units for those objects: feet or meters for human scale objects, Angstroms for molecules, and so forth.

Thus far only strict hierarchical models (i.e., true trees) have been described as potential representation systems. However, it is often very important to be able to represent, display and navigate more general graph structures that may contain loops or other cyclic relationships. Such structures would be impossible to represent completely in absolute coordinates, and even relative coordinate systems have difficulty with them. To see this, imagine a node A that contains node B. Being a sub-node, node B (or a copy of it)

would need to be graphically modeled "smaller" and contained within node A when using an absolute coordinate system. If node B also contained node A, then it would need to contain a smaller copy of A that would contain an even smaller copy of B, ad infinitum. In a system that displays only a portion of a general graph at a time as a user navigates from node to node, a relative coordinate system avoids the need to produce copies of graphical nodes at varying locations and scales. The viewing mechanism could descend from A into B and then deeper again back into A as many times as desired. However, with relative coordinate systems, cyclic information structures may still cause infinite recursion of context. For this reason, cyclic graphical structures are typically not allowed in conventional absolute or relative coordinate modeling systems.

Accordingly, it is desirable to provide a system and method for representing and navigating arbitrarily graph structured information spaces.

SUMMARY OF THE INVENTION

The present invention overcomes the limitations of conventional information representation and navigation systems by providing a 3D display and navigation system that employs an arbitrarily structured set of graphical nodes and a viewer module. The graphical nodes correspond to and graphically represent information nodes in an information structure. Each of the information nodes may have a number of semantic containment relationships with child information nodes. The semantic containment relationships of the information nodes are modeled by graphical containment relationships between corresponding graphical nodes, as follows.

Each graphical node has a bounded volume defined in a relative 3D coordinate space, and relations to parent and/or child graphical nodes. The 3D coordinate space of a parent graphical node contains the child graphical nodes that correspond to the child information nodes semantically contained by the parent information node. Preferably all coordinate spaces are right rectangular in shape, and all coordinate spaces are axially aligned with respect to each other. Also preferably, all coordinate spaces are unit volumes. Child graphical nodes are contained within the coordinate spaces of their individual parent graphical nodes, and have, for each of their parent nodes, a scale value that describes how large they are relative to the volume or dimensions of the of the parent node's coordinate space.

A viewer module renders the display of the graphical nodes from a viewpoint that faces along an axially aligned vector in any of the 3D coordinate spaces, but which is free to pan and zoom. Preferably the display is projected around a view direction vector that is axially aligned with the depth axis of the coordinate space. The viewer module maintains a dynamically modifiable camera model or view volume that intersects a portion of a current 3D coordinate space of a current graphical node to be rendered according to the depth of the viewpoint in the current 3D coordinate space. Only those child graphical nodes that intersect the view volume are rendered by the viewer module. The orientation of the view volume is always axially aligned with the current coordinate space, and not rotated with respect to it.

The view volume and the graphical nodes that intersect it may be rendered using either perspective or parallel projection techniques. In an embodiment using a perspective projection, the graphical nodes are rendered with respect to both their scale values and their relative distances from the viewpoint, so that objects that are closer in the 3D coordinate space appear larger, and objects that are farther away appear smaller. This approach makes navigation of an information structure analogous to navigation in a real 3D space, providing an intuitive environment for most users. In an embodiment using parallel projection, all graphical nodes are rendered as a function of their scale value, so that graphical nodes having the same scale value are rendered at the same size, regardless of their location in the view volume relative to the viewpoint.

The present invention provides various navigation methods and features. The system accepts user inputs to move the viewpoint. As the viewpoint moves in the current coordinate space of a current graphical node, the view volume is dynamically adjusted according to the current depth of the viewpoint in the current coordinate space. Preferably, the view volume is inversely proportional to the depth of the viewpoint along a depth axis of the current coordinate space. Thus, as the depth of the viewpoint increases, the view volume shrinks relative to the volume of the current coordinate space; likewise, as the depth of the viewpoint decreases, the view volume increases relative to the volume of the current coordinate space. The viewer module selects which of the child graphical nodes within the current coordinate space to display, by determining which child graphical nodes have 3D coordinate extents that intersect the view volume; in other words, which are visible within the view volume. These child graphical nodes are then rendered relative to the bounds of the dynamically scaled view volume based on their scale values and locations within the current coordinate space.

A user can enter the 3D coordinate space of a child graphical node by moving toward a rendered image of the child graphical node within the current coordinate space. As the viewpoint enters the 3D coordinate space of the child graphical node (by passing through the rendered image of the graphical node), the coordinate space of that child graphical node becomes the current coordinate space. Its further child graphical nodes are then rendered, again in accordance with a re-computed view volume based on the new position of the viewpoint within that child graphical node's coordinate space. Entering the coordinate space of a child graphical node may or may not trigger the display of additional levels of the hierarchy. The present invention includes this strategy as well as others that will render to arbitrary depths of the hierarchy depending on the graphical size and number of child graphical nodes in each level. For example, one child hierarchy where most graphical nodes have many small children may only show one or two levels, whereas another child hierarchy where most graphical nodes have few children most of which are large may display three or four levels. In all cases, however, the current coordinate space changes as the viewpoint enters or leaves the coordinate space of child graphical nodes.

These features of the present invention provide various benefits, when applied to either arbitrary graphs or the more limited true hierarchies. First, the use of an axially aligned vector for the orientation of the view direction and view volume helps to prevent users from becoming "lost" in the information space represented by the graphical nodes. Since the orientation of the view direction is restricted to a single direction, users do not have to mentally keep track of which direction they are facing in the space, or whether they are moving in circles or unnecessarily backtracking. Similarly, the axial alignment of all coordinate spaces and the view volume further reinforces the sense of direction and movement between coordinate spaces and the relative location of information within the overall information structure.

Second, the use of relative coordinate systems, which are particular to each graphical node, and having a bounded volume, eliminates the problems of numerical resolution that arise in systems using absolute coordinates to locate all objects in a hierarchy having an arbitrary number of levels. As a result, there is essentially no limit to the number of levels of the hierarchy, or to the complexity of relationships between graphical nodes. It thus becomes possible to model the 3D coordinate space of a graphical node independently of the spaces of any of its parent nodes. It further allows any item of information to be modified without having to recursively apply transformations throughout the graph.

The volumes of each graphical node's 3D coordinate space and the scaleable view volume allow for the real-time selection of those child graphical nodes that intersect the view volume, and the ignoring those nodes that do not (i.e., are completely outside of it and therefore off-screen). This reduces the number of objects to be rendered and improves display performance. Further, the bounded volume of each 3D coordinate space enables users to understand that they are always within the scope or context of a single graphical node. This improves the user's understanding of the overall structure of the information space represented by the graphical nodes.

DETAILED DESCRIPTION OF THE PREFERRED EMBODIMENT

Figure 1:
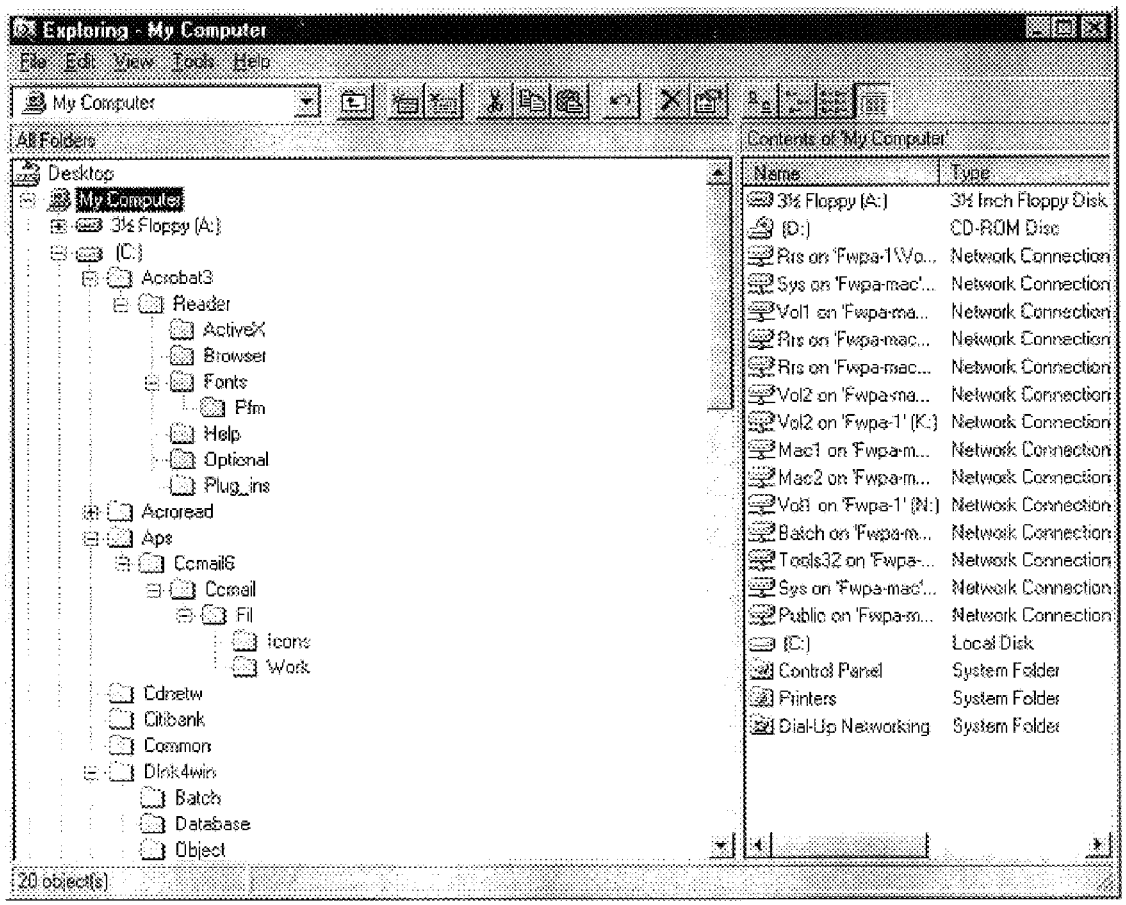
FIG. 1 is an illustration of a conventional hierarchical display of information.
Figure 2:
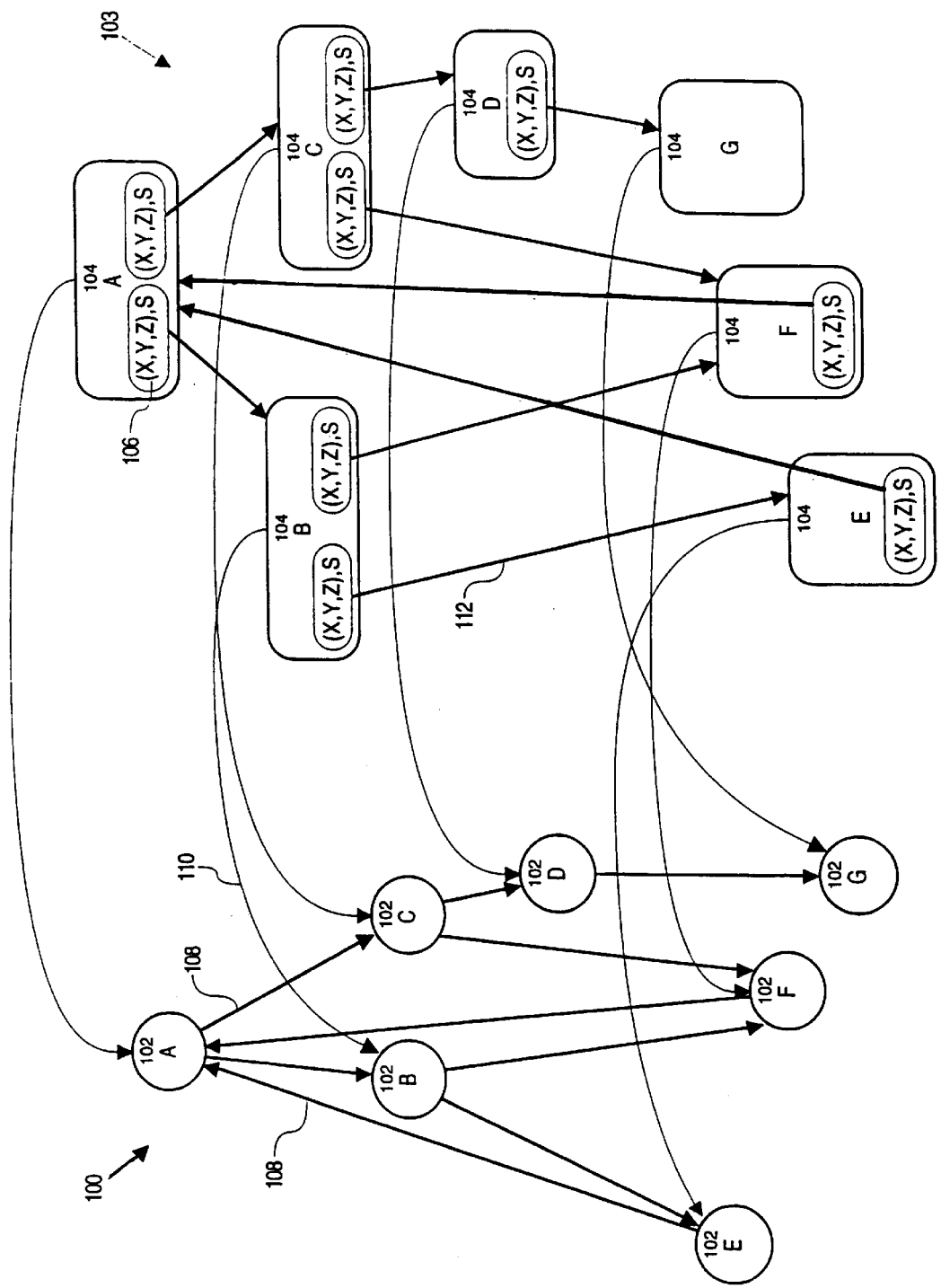
FIG. 2 is an illustration of an information graph and related scene graph.

Referring now to FIG. 2 there is shown an illustration of an information graph 100 and related scene graph 103. The information graph 100 comprises a plurality of information nodes 102. An information node 102 stores data representing an item of information, the content of which is dependent on the information structure. For example, information nodes 102 may represent topics, subtopics, documents, authors and images in a document collection; directories, subdirectories, files and programs in a file system; financial data, companies, and other finance information in a financial analysis system; programs, code objects, and other programming resources in an application development environment; or any other types of structured information. In this description specific information nodes 102 of the information graph 100 or graphical nodes 104 of the scene graph 103 are referenced by their letter labeling, and the corresponding identity of information nodes 102 and graphical nodes 104 is shown by the identity of labeling, "A", "B", and so forth.

An information node 102 supports a containment relationship with zero or more other information nodes 102 in a parent-child relationship. The containment relationship is modeled in the information graph 100 as a directed link 108 from a parent node to a child node. Any type of containment relationship may be modeled. Most containment relationships can be categorized as either complete containment, such as an is-a or part-of relationship, or partial containment. Complete containment relationships describe strict hierarchical relationships such as topics and subtopics, whereas partial containment relationships can define arbitrarily related topics.

The information graph 100 is a true graph in that any information node 102 can have any other information node 102 as a child, any child can have more than one parent, and a parent information node can have multiple children. This allows for any arbitrarily complex network of information nodes 102. FIG. 2 illustrates this aspect of the information graph 100 with respect to information nodes A, E and F, where A is a parent node that contains E and F, and yet is also contained by both of these nodes, as indicated by the directed link from each of these nodes back to information node A.

Corresponding to the information graph 100 is a scene graph 103 comprised of a plurality of graphical nodes 104. Each graphical node 104 has an association 110 with exactly one information node 102, and provides the visual representation of the associated information node 102 on a computer display. The graphical nodes 104 have the same containment relationships as their associated information nodes 102, with a directed link 112 from a parent graphical node to zero or more child graphical nodes, again producing an arbitrarily complex graph structure of graphical nodes 104. Cyclical relationships in the information graph 100 are thus mirrored in the scene graph 103, as shown by the directed links from graphical nodes E and F back to graphical node A.

Figure 3:
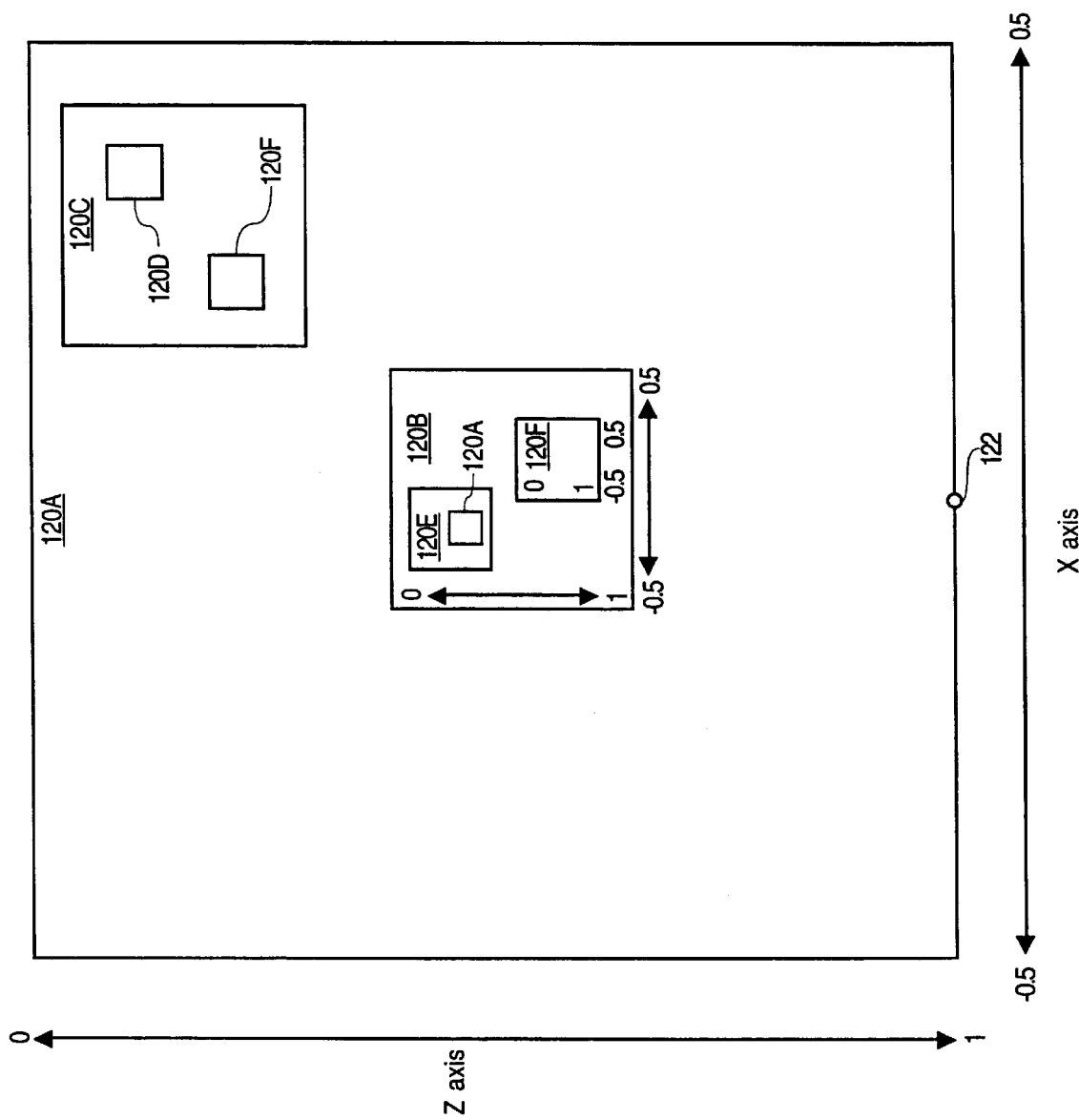
FIG. 3 is an illustration of the bounded volumes of a number of graphical nodes in a scene graph.

Referring now to FIG. 3, each graphical node 104 has a relative, bounded volume defined in a 3D coordinate space 120 associated with it. In FIG. 3, the illustration is from the "top" of the coordinate space looking "down" into it, along the Y axis, and thus only the XZ plane of the volumes 120 are seen. The coordinate space 120 is relative in that coordinates within one coordinate space 120 of one graphical node 104 are defined irrespective of the coordinate spaces 120 of other graphical nodes 104.

When rendered on a computer display, the coordinate space 120 and its contents are rendered from the viewpoint 122, which defines the display coordinate origin (0,0), and which is made coincident with the center of the display surface. The viewpoint 122 is movable by the user, as further described below.

A coordinate space 120 is bounded to define a finite volume in that there are fixed valid minimum and maximum coordinate ranges along each axis of the coordinate space 120. An attempt to move the viewpoint beyond the maximum Z range (when Z is assumed to be the depth axis and positive Z is "coming out" of the display) of the coordinate space 120 takes the user out of the coordinate space 120 of that graphical node 104 and into the coordinate space of a parent graphical node 104, if it has one. An attempt to move beyond the valid X and Y ranges results in the viewpoint 122 being constrained to the respective limiting value. A coordinate space 120 is denoted by a bounded volume in the form of a right rectangular, axially aligned box (rectangular prism). In one embodiment, each of the coordinate spaces 120 has a unit volume, in that the valid ranges along each axis are of unit length. The valid Z range is preferably between 0 and 1, while the X and Y ranges are preferably between −0.5 and 0.5, though other ranges may be used. For simplicity of description, but without loss of generality, these choices of axis labels and ranges will be assumed throughout.

While the coordinate spaces 120 of related graphical nodes 104 are independent and relatively defined, the coordinate space 120 of a child graphical node 104 is completely contained within the coordinate space 120 of its parent graphical node 104, forming a series of nested subspaces. For example, in FIG. 2, graphical node A has graphical containment relationships with its child graphical nodes B and C due the semantic containment relationships of their associated information nodes 102. The coordinate space 120A of graphical node A thus completely contains the coordinate spaces 120B and 120C of its child graphical nodes B and C. Likewise, graphical node B has graphical containment relationships with its child graphical nodes E and F, and so its coordinate space 120B completely contains their coordinate spaces 120E and 120F. In this manner, the semantic containment relationships expressed in the information graph are instantiated as graphical containment relationships in the scene graph. Further, just as a child information node 102 can be semantically contained by a number of parent information nodes, so too is the corresponding child graphical node 104 graphically contained within the coordinate spaces 120 of each of its parent graphical nodes.

For each graphical node 104 there is graphical instance data 106 that represents the placement and any other usage data of that node within the coordinate space 120 of each of its parent graphical nodes. The graphical instance data 106 includes a coordinate location and a scale value. The coordinate location defines the relative (X,Y,Z) position of the child graphical node 104 within the coordinate space 120 of a parent graphical node 104. In FIG. 3, graphical node B has a coordinate location at about the center of the coordinate space 120A of its parent graphical node A; graphical node C has a coordinate location in the right rear region of the coordinate space 120A.

The graphical instance data 106 of a graphical node 104 also contains a scale value (S) describing the relative size, for all dimensions, of the graphical node 104 within the coordinate space 120 of a parent. For example, a scale value of 0.5 indicates that the graphical node 104 is one-half the size of the parent's coordinate space 120 along each of the X, Y, and Z axes. In FIG. 3 graphical nodes B and C have been instanced with equal scale values by graphical node A, and thus have the same size within the coordinate space 120A of their parent graphical node A. Similarly, graphical node B's instances of E and F use the same scale value, approximately 0.4, but graphical node C's instances of D and F have a different equal value, approximately 0.25.

A parent graphical node 104 is responsible for establishing and updating the graphical instance data 106 of each of its child nodes, and may employ any variety of mechanisms for establishing the coordinate locations and scale values of its children based on any aspect of their containment relationships, such as their types, number, the amount of information contained by each node, age, and the like. Accordingly, where a graphical node 104 is the child of multiple parents, it is likely to have a different coordinate location and scale value within each parent graphical node's coordinate space 120. For example, graphical node F is instanced with different scale values by B and C and therefore shows in FIG. 3 as two differently sized boxes.

In one embodiment, a parent graphical node 104 stores the graphical instance data 106 for each of its child graphical nodes 104, as illustrated in FIG. 2. In an alternate embodiment, a child graphical node 104 stores a list of its coordinate locations and scale values in each of its parent graphical node's coordinate spaces 120.

Figure 4:
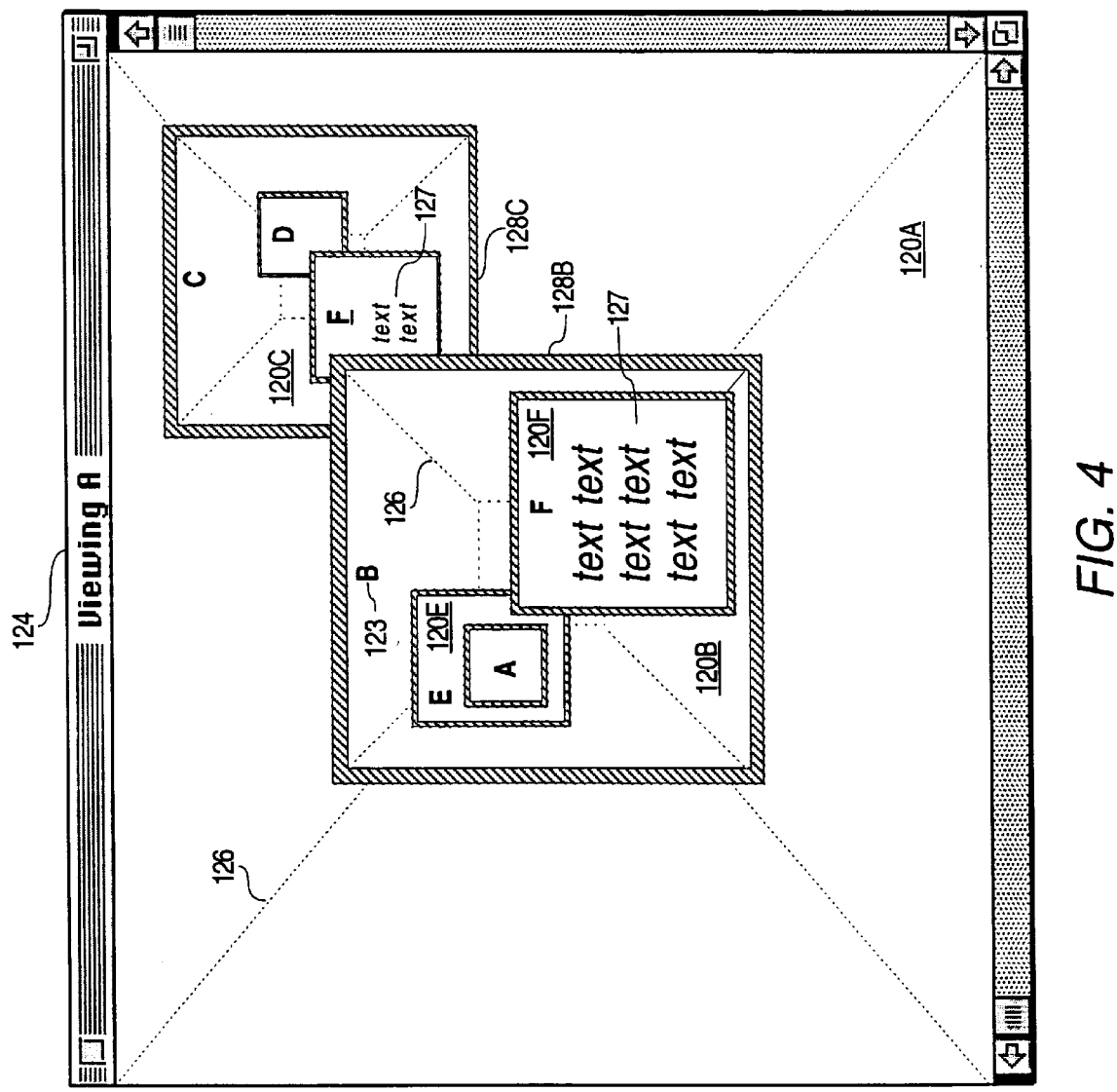
FIG. 4 is an illustration of a computer display of the graphical nodes of FIG. 2.

The illustration in FIG. 3 is merely schematic, and does not illustrate how the graphical nodes 104 are rendered on a computer display and appear to the user. An example of such a computer display 124 is shown in FIG. 4. A coordinate space 120 of a graphical node 104 is rendered from the viewpoint 122 (FIG. 3), which views the coordinate space 120 along an axially aligned vector of projection, here parallel to the Z axis, but at any location in the coordinate space 120. The user is able to move the viewpoint 122 in the X and Y directions (panning), plus into and out of the display in the Z direction (zooming), but the orientation of the vector of projection remains fixed. Restricting the vector of projection in this manner helps users from becoming "lost" in the coordinate space 120, and provides a uniformity of display that helps guarantee that the display makes sense at all times.

In FIG. 4 there is shown a computer display 124 of the coordinate space 120A of graphical node A (from the scene graph 103 of FIG. 2), rendered from a viewpoint 122 at a user selected depth in the coordinate space 120A, as might be displayed on a conventional computer display. The top level graphical node A of the scene graph 103 of FIG. 3 is here the current graphical node 104, and its coordinate space 120A is the current coordinate space 120. Note that there is no rendering of any image of top level graphical node A itself since the viewpoint 122 is within its coordinate space 120A. Rather, only potentially visible ones of its child graphical nodes B and C are rendered. In addition, the child graphical nodes D, E, and F are also rendered. Also note that graphical node F, which is a child of both graphical nodes B and C, has a different location and scale within each of its parent's coordinate spaces 120; and text 127, which is part of node F, is scaled in conjunction with the different renderings of F.

Finally, graphical node A, which is both the current top level graphical node and a child of node E, is rendered as being within graphical node E's coordinate space 120E. Thus, fully cyclical graph structures are realizable in the modeling system of the present invention. An image of graphical node A is not rendered within graphical node F to illustrate the ability of the viewer module to selectively and individually control the number of levels displayed within each coordinate space.

In this example, the graphical nodes 104 are rendered in a very simple box-like graphical form 128, with only simple identifying labeling 123. In an actual implementation, the labeling 123 would preferably include a text string descriptive of the information node 102 associated with the graphical node 104, such as a topic name, document name, file directory name, or the like. The graphical forms 128 themselves may be video, text, or other visual constructs, including 3D graphical constructs with various visual adornments, such as borders, coloring, icons, and the like. In addition, perspective lines 126 are optionally illustrated to provide the user a visual representation of the volume and depth of the coordinate space 120.

As noted above, either unit or non-unit volumes may be defined within the coordinate spaces of the graphical nodes 104. Preferably the graphical form 128 of a graphical node has a shape that is consistent with the dimensions of its volume and especially of the rectangular "front" of the graphical nodes' coordinate space 120. For example, in FIGS. 3 and 4, unit volumes are used, and the graphical form 128 for the front of each graphical node is a square, given unit ranges in the X and Y extents. This is useful to ensure that the various node selection methods match well with user expectations based on the display features of graphical nodes.

In an alternate embodiment, where non-unit volumes are used, the graphical forms 128 may take other forms, such as rectangles, trapezoids, and so forth. Thus, while 2D graphical forms 128 may be used to represent the front surface of a child graphical node's coordinate space, the entire 3D volume of such spaces are understood by the user as being contained within the current coordinate space 120 and reachable by simply moving the viewpoint 122 toward and into such spaces.

The rendering and display of the graphical nodes 104 is managed by a viewer module, which renders the child graphical nodes 104 of the current graphical node 104 based on the scale value and coordinate location of each child graphical node 104. The (X,Y) coordinate location is used for each of the child nodes for a parallel projection, and the (X,Y,Z) location is used for perspective projection, so that proper perspective (scaling by distance and occlusion of other graphical nodes) is achieved.

The viewer module maintains a view volume 130, which intersects the current coordinate space 120, and may fully contain it. The viewer module dynamically scales the view volume 130 according to the current depth of the viewpoint 122 in the current coordinate space 120.

The view volume 130 and the graphical nodes within it may be rendered with either a parallel, or perspective projection. In a parallel projection (FIGS. 5, 6 and 8), the view volume 130 is rendered as a box (rectangular prism) in which the graphical nodes are projected parallel to the sides of the box. In a perspective projection (FIG. 10), the view volume 130 is in the shape of a truncated pyramid with the graphical nodes projected in a radiating manner onto the base of the pyramid. FIG. 4 illustrates the rendering of the view volume 130 using a perspective projection, which scales graphical nodes in inverse proportion to their distance from the viewpoint 122, such that graphical nodes that are at greater distances from the viewpoint 122 are rendered smaller in size than nearer nodes. In FIG. 4, the graphical form 128B of graphical node B is rendered larger and in front of the form 128C of graphical node C, even though they have the same scale value and relative size (as shown in FIG. 3). Similarly, node F is rendered larger and in front of node D in coordinate space 120C.

Figure 5:
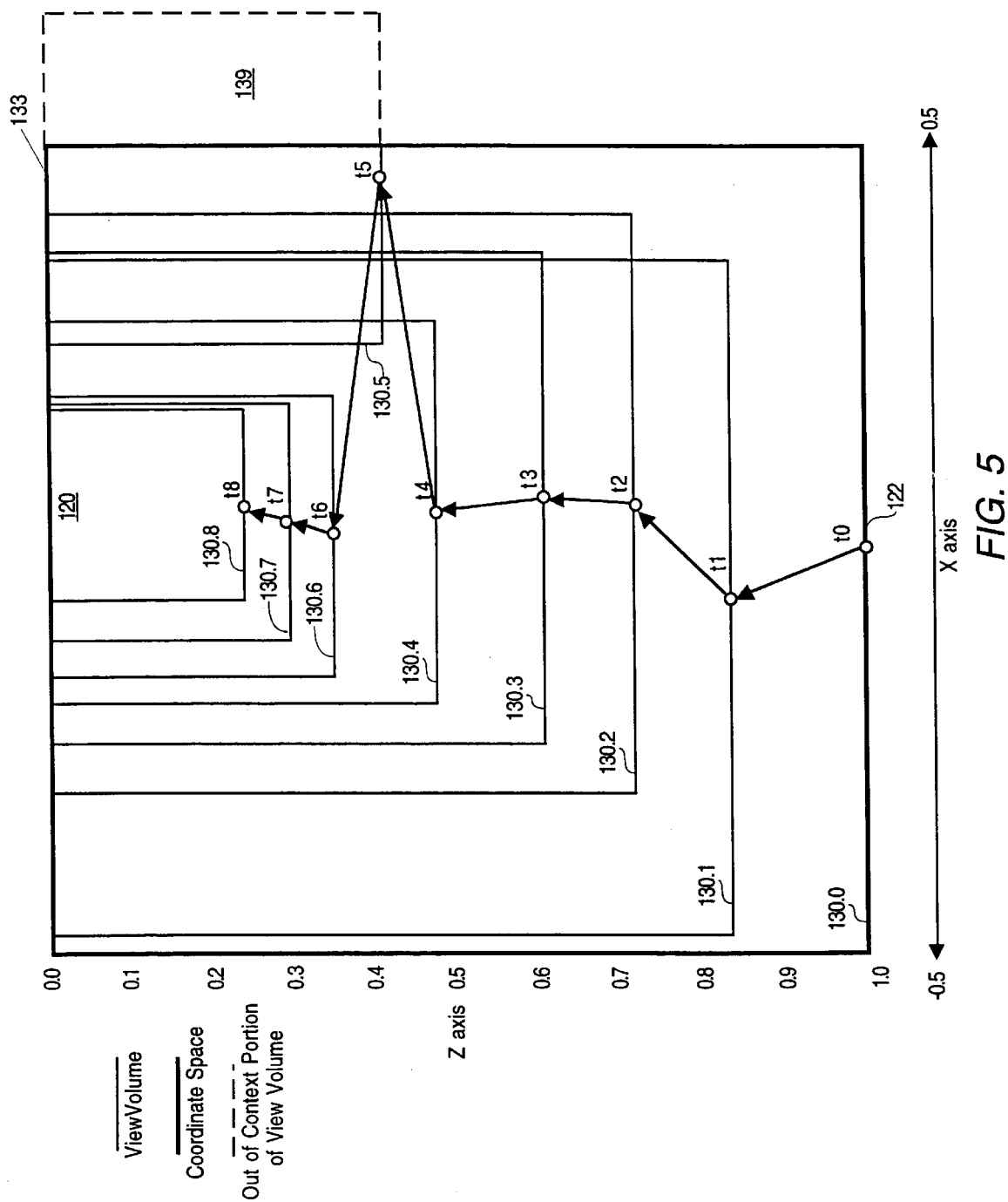
FIG. 5 is an illustration of dynamic scaling of the view volume in response to changes in the depth of the viewpoint over time using parallel projection.

Referring to FIG. 5 there is a diagrammatic illustration of the dynamic scaling of a view volume 130 in response to user movement of the viewpoint 122 in a current coordinate space 120 over time. FIG. 5 is a top view of that coordinate space 120, like FIG. 3, however, only the bounds of the coordinate space 120 and view volume 130 are shown for convenience of illustration. The viewpoint 122 moves through a number of points in the current coordinate space 120, indicated by times t0 to t8, in response to user inputs to a user input device. At each time, the size of the view volume 130 is proportional to the distance of the viewpoint 122 from the rear plane 133 of the coordinate space 120. The rear plane 133 is defined in this embodiment by the XY plane at Z=0. A cubic view volume 130 in a parallel projection at any time t has a depth (Z extent), width (X extent), and height (Y extent) equal to the current Z coordinate value of the viewpoint 122, thereby forming a volume which may extend beyond the bounded volume of the current coordinate space 120. The view volume 130 is anchored at the viewpoint 122, and the viewer module preferably constrains the viewpoint 122 to stay within the bounds of the current coordinate space 120. In alternate embodiments, the depth of the coordinate space 120 may be defined using the X or Y axes. The resulting behaviors of the system are functionally the same, but result in different visualizations of movement through the coordinate spaces, such as a 'bird's eye view' of the coordinate space, which scales in size as the user scrolls up/down (where depth is defined in Y), or left/right (where depth is defined in X), resulting in display images similar to the illustrations in FIG. 6, for example, but with the view volume at each time step scaled to fill the display.

Referring to FIG. 5, at time t0, when the viewpoint 122 is at Z=1, the view volume 130.0 is equal to the total volume of the coordinate space 120. At time t1, the user has moved the viewpoint 122 to about Z=0.82 and so the width of the view volume 130.1 extends from +/−0.41 in X and Y from the current location of the viewpoint 122.

At time t2, the user has continued to move forward into the coordinate space 120, and the viewpoint 122 is at about Z=0.72. Again, the view volume 130.2 is reduced proportionally. At time t5, the user has moved the viewpoint 122 very close to the rightmost extent of the current coordinate space. The portion 139 of the view volume 130.5 that extends "beyond" the bounds of the current coordinate space 120 is not rendered as any data beyond those bounds are outside the context of the current coordinate space 120. At times t6 through t8, the user has continued to approach the rear plane 133, and each time the view volume 130 is correspondingly reduced in size.

The dynamic scaling of the view volume 130 effects the display of the graphical nodes contained in the current coordinate space 120 in several ways. For example, as the view volume 130 changes, the coordinate extents of some graphical nodes 104 may place these nodes outside the view volume 130, particularly as the view volume 130 shrinks as the user moves deeper. Should the user move back (zoom out) to increase the view volume 130 (e.g., moving from Z=0.3 to Z=0.8) then these graphical nodes 104 may come back into view and be rendered by the viewer module. Similarly, should the user move the viewpoint 122 further to the left or right, the view volume 130 is shifted left or right accordingly to remained anchored at the viewpoint 122, and various ones of the graphical nodes 104 may not be selected for rendering if they do not intersect the view volume 130 following such movements.

Figure 6:
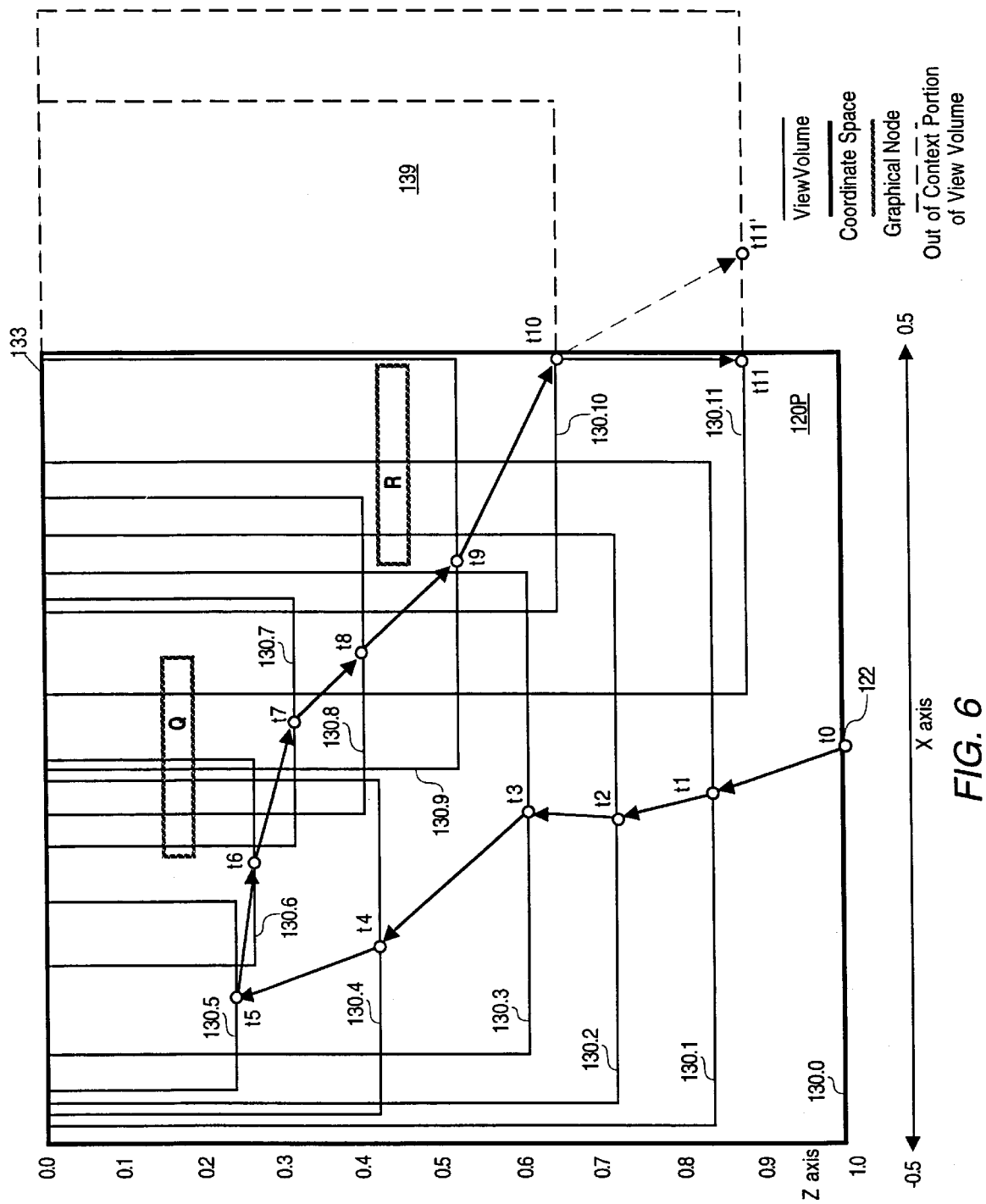
FIG. 6 is an illustration of how the dynamic scaling of the view volume selects graphical nodes for display.
Figure 7:
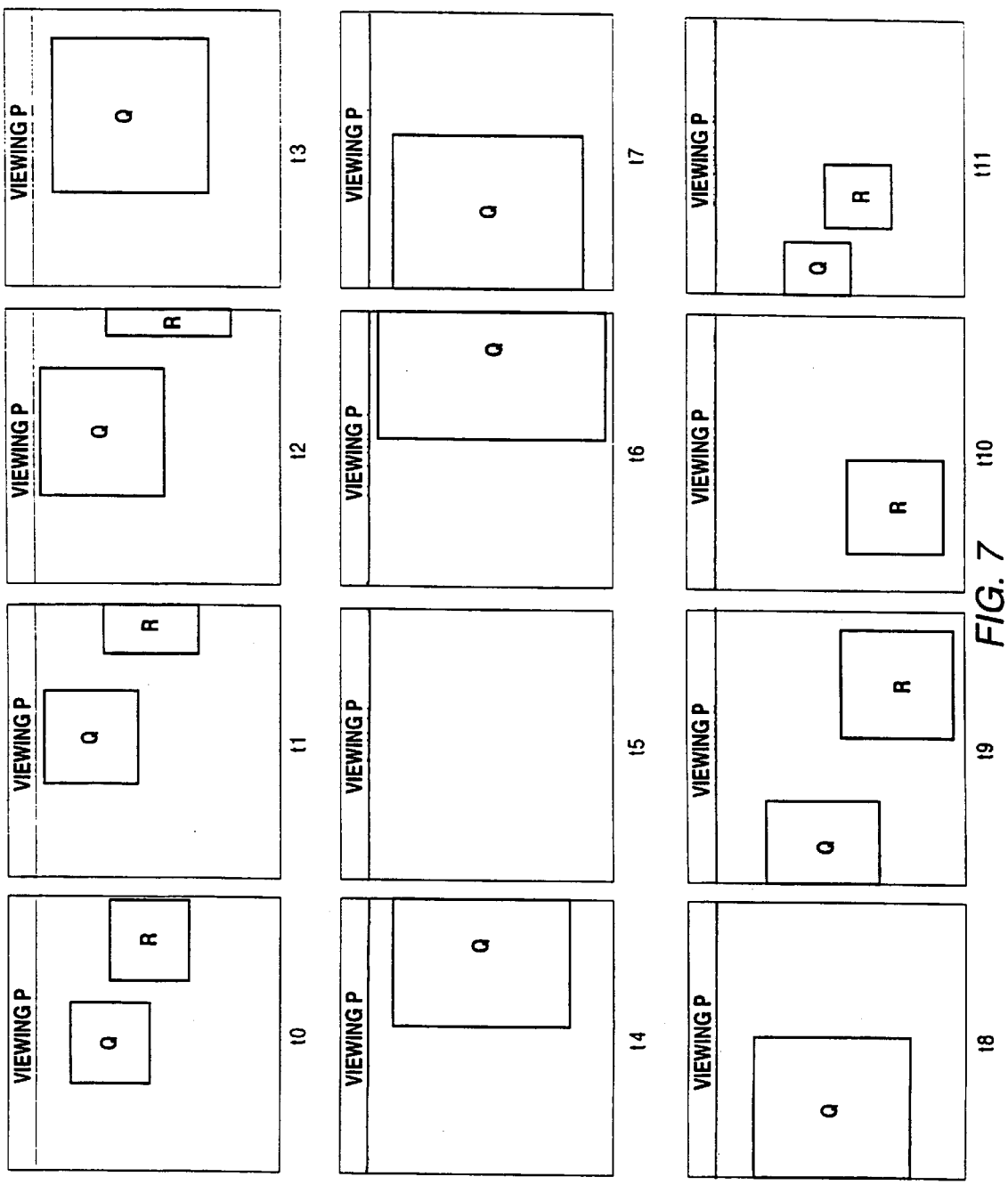
FIG. 7 is a time series illustration of computer displays corresponding to FIG. 6.

FIGS. 6 and 7 illustrate an example of this behavior. In FIG. 6, there is shown a coordinate space 120P of a graphical node P in which two graphical nodes Q and R are distributed at various locations. Graphical nodes Q and R are here assumed to have the same scale values. Also shown is a depiction of the path of the viewpoint 122 over times t0 to t11 through the coordinate space 120P in response to user control of an input device. FIG. 7 is a time series illustration of corresponding computer displays at times t0 to t11 in FIG. 6, and illustrating how the graphical nodes 104 are rendered relative to the view volume 130. FIGS. 6 and 7 illustrate the behavior and rendering of the view volume 130 and graphical nodes 104 using parallel projection.

At time t0, both graphical nodes Q and R are wholly within the view volume 130.0, and are completely visible from the viewpoint 122. In FIG. 7, a parallel projection is used, and thus even though they have different depths in their parent coordinate space 120P, as shown in FIG. 6, the nodes are rendered as having the same size based on their scale values.

At time t1 the user has moved toward the rear plane 133, and the view volume 130.1 is reduced in size and only about the left half of graphical node R is visible from the viewpoint 122. Graphical node Q remains fully in view.

At time t2 an even smaller portion of the left edge of graphical node R remains in the view volume 130.2 and is visible from the viewpoint 122. Nodes Q and R are increasing in size since the user is moving deeper into coordinate space 120P, and nodes Q and R fill a greater percentage of the shrinking view volume.

At time t3 the user has moved the viewpoint 122 sufficiently close to the rear plane 133 that graphical node R lies outside the view volume 130.3 and is no longer visible from the viewpoint 122. As result, the viewer module does not render graphical node R. (In an alternate embodiment, some portion of R may be rendered to accommodate a non-square display window.) Graphical node Q remains in the view volume 130.3 and is rendered accordingly in size and location relative to the viewpoint 122.

At time t5 the user has approached the rear plane 133 closely enough to shrink the view volume 130.5 enough to completely exclude both graphical nodes Q and R.

At time t6 the user has moved further to the right, bringing graphical node Q back into view, but now scaled larger because the node now covers roughly half of the view volume.

At times t7 and t8 the user continues to pan to the right of the coordinate space 120P, and so graphical node Q continues to move to the left in the displays. In addition, the user is now moving back (zooming out) and so the view volume 130 is now increasing as the viewpoint's Z value increases. Correspondingly the size of graphical node Q's image is reduced.

At time t9 the user has continued to zoom back, decreasing the depth of the viewpoint 122 in the coordinate space 120P, and has panned further to the right side of the coordinate space 120P. At this point, graphical node R is now just fully within the view volume 130.9 and is rendered for display by the viewer module.

At time t10 the user has moved the viewpoint 122 to the right edge of graphical node R. The view volume 130.10 is also panned to the right sufficiently to exclude graphical node Q. Graphical node R is in the left half of the view volume 130.10 since it is to the left of the viewpoint 122 and is rendered accordingly.

Finally, at time t11 the user has attempted to move the viewpoint 122 to point t11', which is beyond the bounds of the coordinate space 120P. Accordingly, the viewer module has forced the viewpoint 122 to stay within the coordinate space 120P by constraining the X coordinate location of the viewpoint 122 to the valid maximum. Again, the view volume 130.11 is scaled accordingly, with the viewpoint 122 anchored with the maximum valid X coordinate value at what would be the middle of the view volume 130.11, when accounting for the region beyond the valid volume of the coordinate space 120P.

In addition to navigation and display of graphical nodes within a single coordinate space 120, the present invention provides for navigation between the coordinate spaces 120 of parent and child graphical nodes 104. Together, these navigation features implement the semantic processes of narrowing, broadening and shifting the scope of information nodes 102 accessible to the user in the information space 100, and thus provide an intuitive mechanism for visually exploring an information space by navigating through it. Since the graphical containment relationships between the graphical nodes 104 correspond to the semantic containment relationships of the information nodes 102, spatial navigation through the scene graph 103 corresponds to semantic or conceptual navigation of the information graph 100. For example, where the information space 100 represents topics of information and documents, navigating from the coordinate space 120 of a parent graphical node 104 to the coordinate space 120 of a child graphical node 104 corresponds to traversing from a broader topic to a narrower subtopics, and vice versa.

Figure 8:
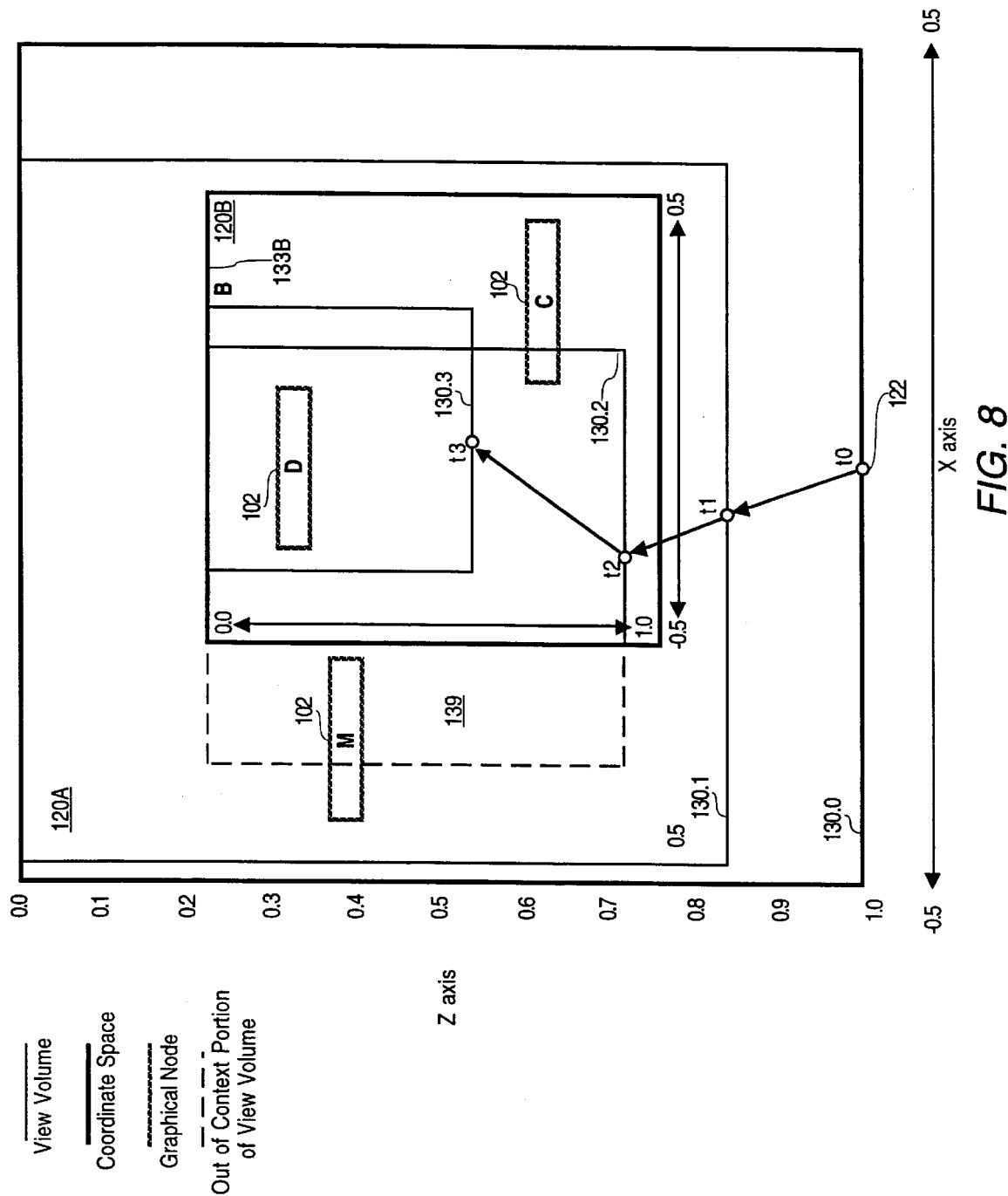
FIG. 8 is an illustration of navigation into the coordinate space of a child graphical node from the coordinate space of a parent graphical node.
Figure 9:
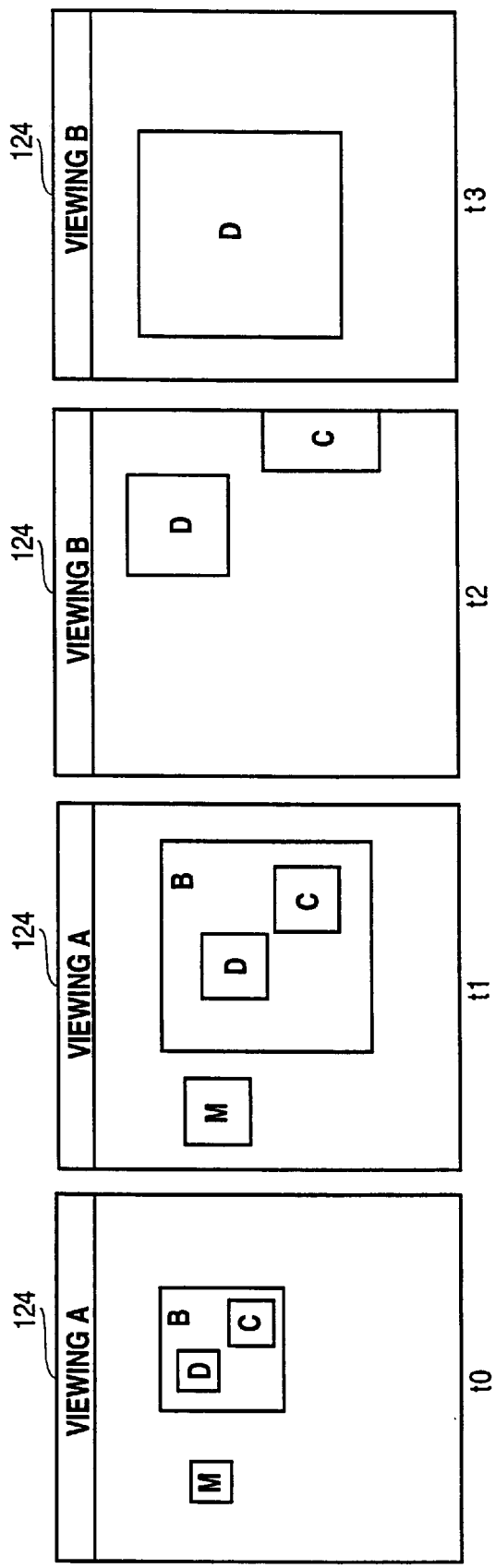
FIG. 9 is a time series illustration of computer displays corresponding to FIG. 8.

FIGS. 8 and 9 illustrate the navigation method for navigating from a parent coordinate space 120 into a child coordinate space 120. In these examples, there is shown the coordinate space 120A of graphical node A and the child coordinate space 120B of graphical node B. Again, FIG. 8 is a schematic illustration from the top of the coordinate space 120, looking down into the coordinate space over times t0 to t3, and FIG. 9 is a time series illustration of computer displays 124 corresponding to the times in FIG. 8, again using parallel projection.

At time t0 the viewpoint 122 is at Z=1.0 in the parent coordinate space 120A. The view volume 130.0 thus corresponds to the entire volume of the parent coordinate space 120A. Visible in the coordinate space 120A from the viewpoint 122 is graphical node B, and some of its children, nodes D and C, as well as graphical node M. Graphical node B is located at about Z=0.73 and graphical node M is much smaller than graphical node B, and is thus rendered smaller in size than graphical node B. FIG. 9 at time t0 illustrates a corresponding computer display 124.

At time t1 the user has moved the viewpoint 122 deeper into coordinate space 120A to about Z=0.83, and accordingly, the view volume 130.1 has decreased in size. Graphical node B is again rendered, this time slightly larger. Graphical node M still intersects the view volume 130.1 and is also rendered slightly larger in size. If a perspective projection was being used, then graphical node B would occlude the image of graphical node M.

At time t2 the viewpoint 122 has just entered the coordinate space 120B of graphical node B, but off to the left hand side of the coordinate space 120B. The view volume 130.2 is now scaled with respect to the rear plane 133B of coordinate space 120B, with a portion 139 extending beyond the valid range of coordinate space 120B. Graphical node M is not rendered because it is not within the scope of graphical node B. Likewise graphical node B may no longer be rendered since it is not contained within its own coordinate space 120B. Rather, only graphical nodes C and D are now rendered since they are within the coordinate space of B and intersect the current view volume 130.2. Graphical node C is partially shown since it only partially intersects the view volume 130.2. In addition, the title bar of the computer display may be updated as shown in FIG. 9 to inform the user that coordinate space 120B of graphical node B has been entered and that graphical node B is now the current graphical node. Navigation in this manner implements the semantic process of narrowing the scope of information nodes 102 that user has access to in an information space. Also note that the coordinate space 120B has its own relative size, as indicated by the Z and X extents of the coordinate space 120B in FIG. 8.

Finally, at time t3 the viewpoint 122 has moved deeper into coordinate space 120B of graphical node B, past the location of graphical node C. The view volume 130.3 is again reduced in size with respect to the rear plane 133B of coordinate space 120B. The location of graphical node C places it outside the view volume 130.3 and accordingly it is not rendered, as shown in FIG. 9. Only graphical node D is rendered, increased in size due to the shrinking of the view volume 130.

Navigation from the coordinate space 120 of a child graphical node 104 to the coordinate space 120 of a parent graphical node 104 operates in a similar, but reverse manner. That is, as the viewpoint 122 moves from a child coordinate space 120 to a parent coordinate space 120, a new set of graphical nodes 104 will be potentially visible within the new current coordinate space 120 and view volume 130 and rendered accordingly. Where a child graphical node 104 has multiple parent nodes, the new current coordinate space 120 will preferentially be that of the parent graphical node 120 from which the child graphical node was entered. Navigation in this manner implements the semantic process of broadening the scope of information nodes 102 that user has access to in an information space.

As another feature of the present invention, the speed with which the viewpoint 122 moves in a coordinate space 120 may be made proportional to the distance of the viewpoint 122 from the rear plane of that coordinate space 120. Thus, where the rear plane is defined as the XY plane at Z=0, then as the viewpoint 122 moves forward and its Z coordinate approaches 0, the rate of change in the viewpoint's location in response to user inputs also approaches 0. In this manner, the user can drive the viewpoint 122 continuously forward, yet never reach the rear plane of a coordinate space 120. This gives the user the impression that each coordinate space is infinitely deep, when in fact the coordinate space has finite depth. This approach thus simulates a coordinate space of infinite depth within a finite, bounded graphical space. Thus, information nodes can have arbitrary containment relationships that define unlimited semantic depth, and yet can be easily represented and manipulated in a finite graphical space.

Figure 10:
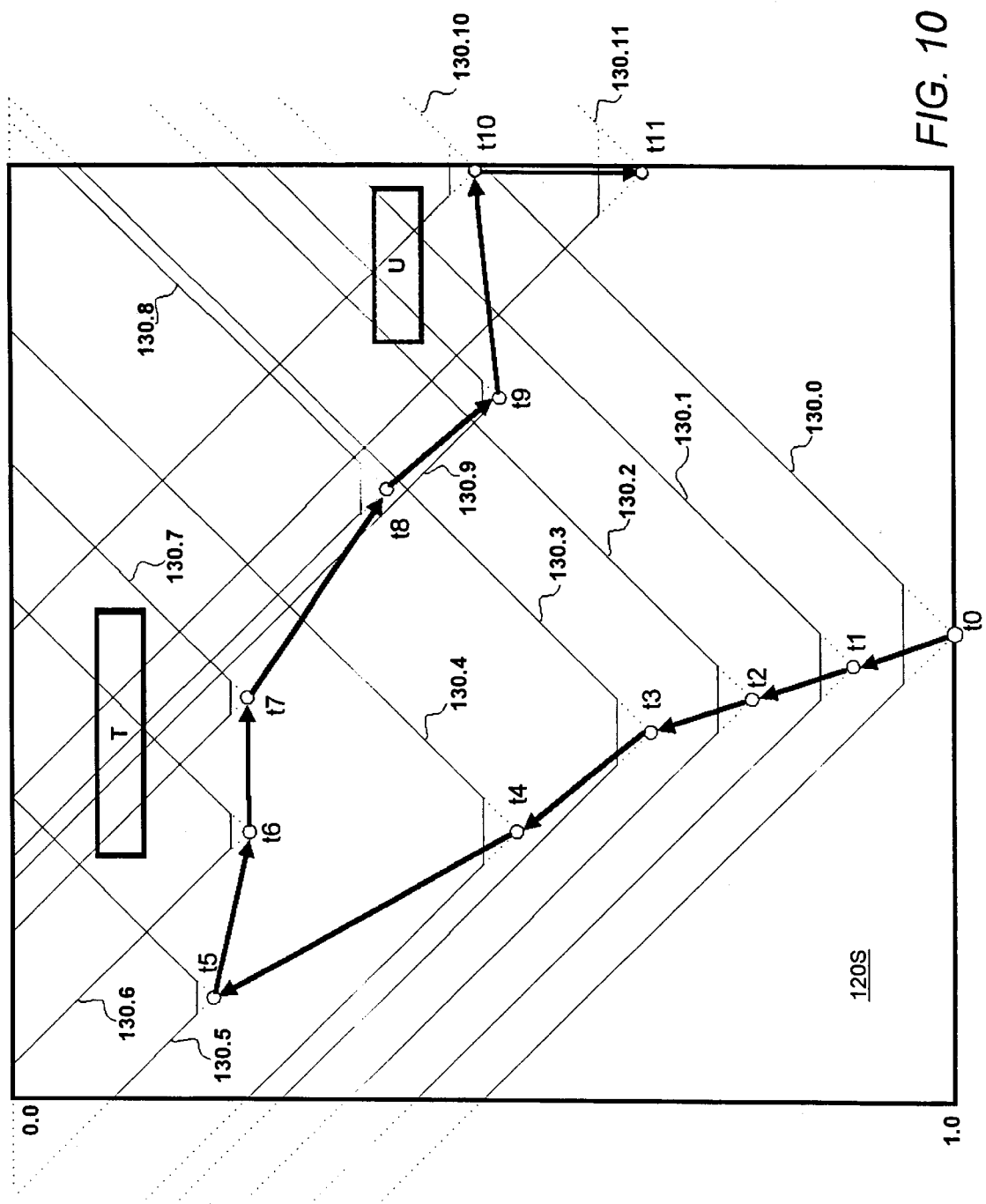
FIG. 10 is an illustration of dynamic scaling of the view volume using perspective projection.
Figure 11:
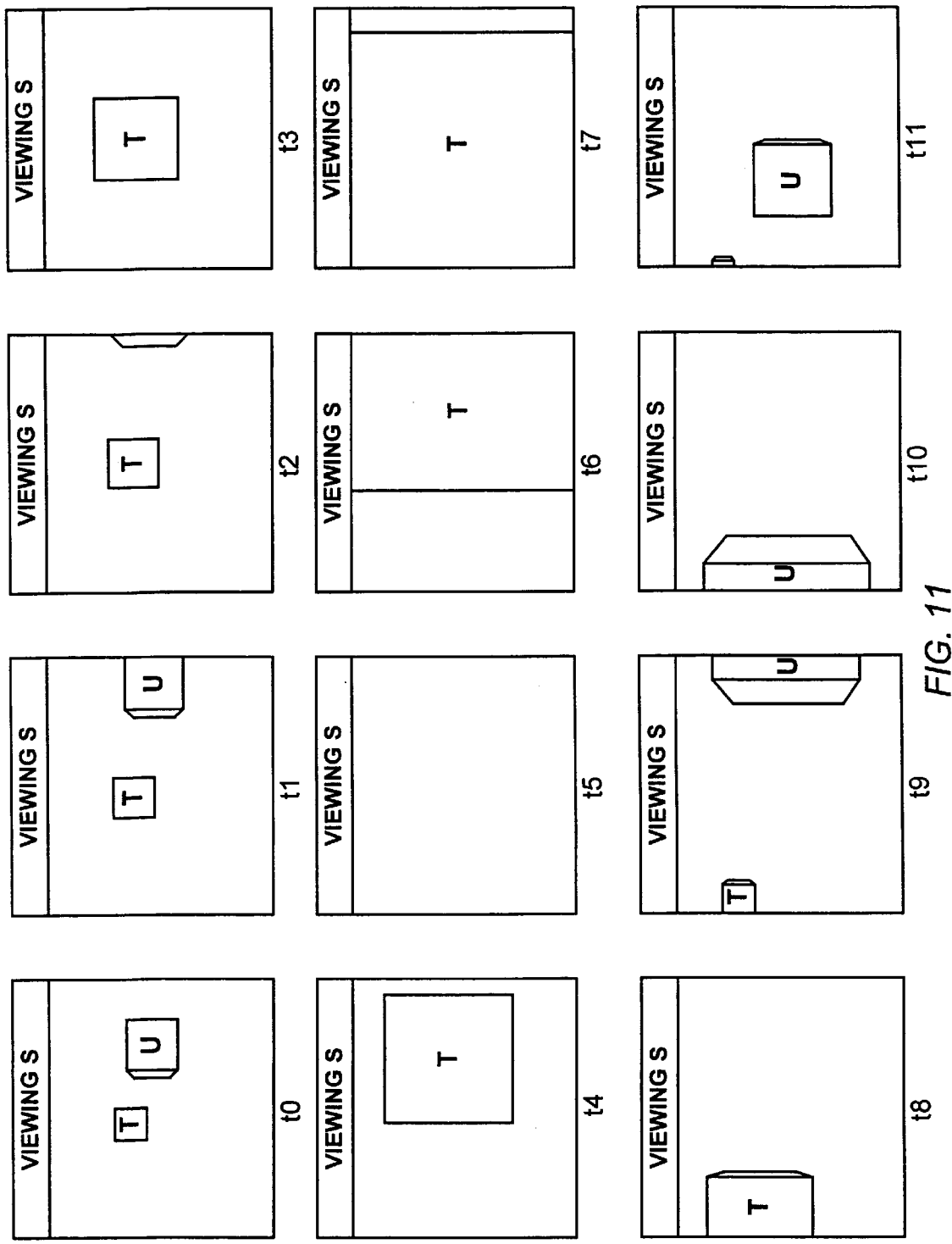
FIG. 11 is a time series illustration of computer displays corresponding to FIG. 10.

As noted above, where a perspective projection is used, then the view volume 130 forms a truncated pyramid. FIGS. 10 and 11 illustrate the dynamic scaling of the view volume 130 in a system using perspective projection. FIG. 10 is similar to FIG. 6, showing a "top" view of a coordinate space 120S, and likewise containing graphical nodes T and U, and showing the movement of the viewpoint 122 over times t0 to t11. FIG. 11 is a time series illustration of corresponding computer displays at times t0 to t11.

In FIG. 10, at any location of the viewpoint 122, the view volume 130 is a truncated pyramid, with the truncated portion nearest the viewpoint 122, which is always at the apex of the pyramid; the bounds of the view volume 130 extend obliquely to the bounds of the coordinate space 120S. At time t0 the viewpoint 122 has just entered the coordinate space 120S, and the view volume 130.0 covers most of the space and includes both graphical nodes T and U. FIG. 11 at time t0 illustrates this view, with images of both nodes displayed in perspective. Note that in this version, graphical node U is smaller than graphical node T (FIG. 10), but initially displays larger than graphical node T (FIG. 11) due to perspective foreshortening.

As the viewpoint 122 moves through times t1 and t2 and approaches node T, node U appears to move further to the right, with only the left, rear edge of U visible at time t2.

At time t3 the view volume 130.3 no longer intersects the extents of graphical node U, and thus this node is no longer selected for display, as shown in FIG. 11. At time t5 the view volume 130.5 also does not intersect node T and thus this node is likewise not selected for display. At times t6 and t7, as shown in FIG. 10, the viewpoint 122 approaches node T very closely, which is then displayed as relatively enlarged. At time t8 the viewpoint 122 has been moved sufficiently to the right to cause the right side of node T to be rendered. At time t9 the user has moved the viewpoint 122 back (towards Z=1.0), and thus the view volume 130.9 increases to the point that it intersects graphical node U again. As shown in FIG. 11, the image of graphical node U is displayed with the corresponding perspective showing the left side of graphical node U.

At times t10 and t11 the viewpoint 122 has been moved to the rightmost boundary of the coordinate space 120S. At time t11 graphical nodes U and T are both rendered, since graphical node T once again intersects the view volume 130.11.

Figure 12:
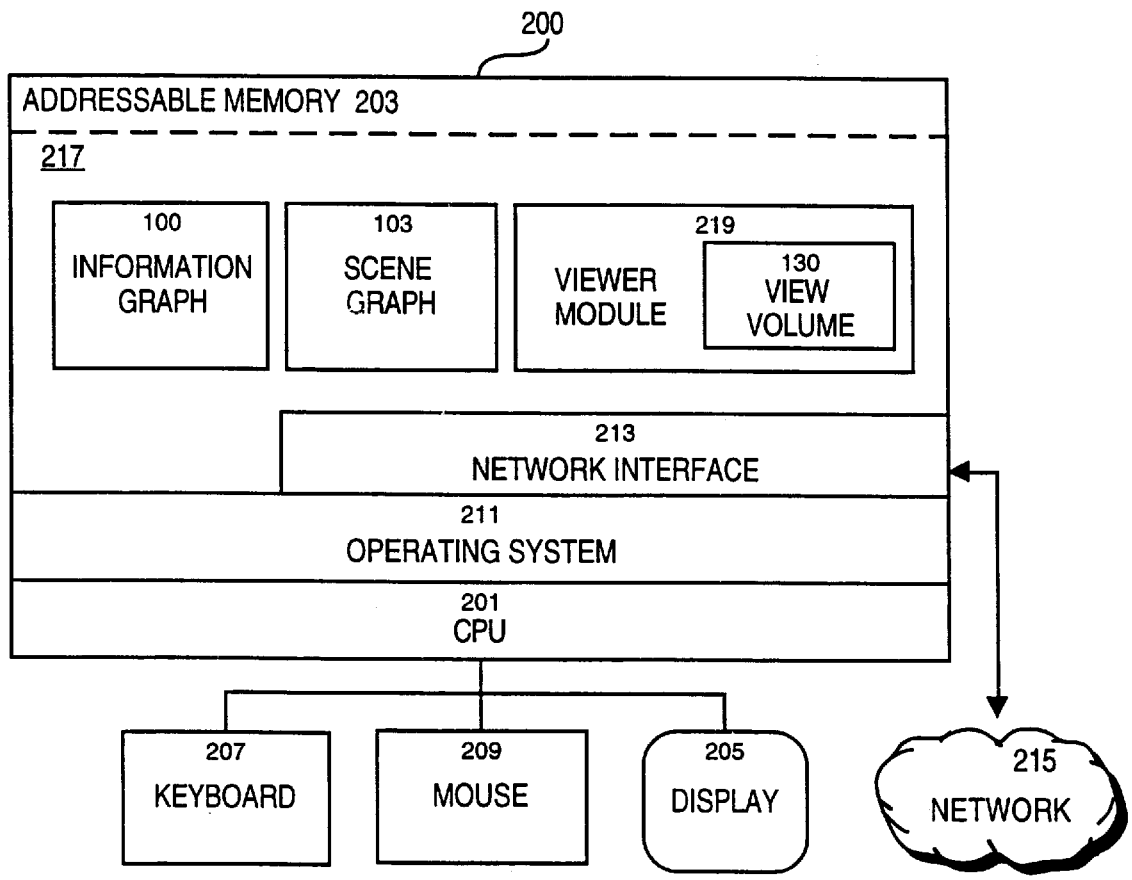
FIG. 12 is an illustration of a computer system in accordance with the present invention.

Referring now to FIG. 12, there is shown an illustration of a computer system in accordance with one embodiment of the present invention. System 200 includes a conventional processor 201, memory 203, display monitor 205, and input devices. Input devices include a keyboard 207 and a mouse 209 or other pointing device. The system 200 executes a conventional operating system 211. A network interface 213 connects the system to a communications network 215, such as the Internet.

The addressable memory 203 includes a software product 217 configured in accordance with the present invention, including an information graph 100 and a scene graph 103 as described above. The addressable memory 203 and network 215 may also include various types of information databases, such as document collections, file systems, images, and the like which are referenced by, and accessible from the information graph 100 or the scene graph 103, to provide content data for association with nodes of the graphs. The addressable memory 203 further includes a viewer module 219 that maintains a view volume 130.

The graphical nodes 104 of the scene graph 103 provide various methods for locating and rendering themselves and their child graphical nodes 104. Each graphical node 104 includes three basic operations. First, a graphical node 104 provides a method for arranging or laying out its child graphical nodes 104 that are contained by it within its coordinate space 120. Arranging a child graphical node 104 involves creating its graphical instance data 106, including coordinate location and scale value within the parent coordinate space 120. Any type of arrangement or layout methodology may be used. Two basic layout methodologies are a rectangular grid and a radial layout. In the rectangular grid layout, the child graphical nodes are arrayed left-to-right, top-to-bottom in a selected XY plane in the coordinate space 120 in a uniformly incremented manner. In a radial layout, the child graphical nodes 104 are uniformly arranged in a circle or ellipse about an anchor point, preferentially with drawn radial lines connecting the anchor point to each child graphical node 104. The radial ordering, of each child graphical node 104, its distance from the anchor point and its scale value may be independently determined by the parent based on its relationship with the child and any other useful factors.

Second, each graphical node 104 contains one or more operations to render itself (including its child graphical nodes 104) on a computer display given a display context defined by the viewer module 219. During display, the display context maintains a refinement stack of coordinate spaces 120, starting with a current top level coordinate space 120, which is being viewed by the user (i.e. the coordinate space 120 in which the viewpoint 122 is currently moving), and containing each of the nested coordinate spaces 120 of the child graphical nodes 104 being drawn at any moment. This current top level coordinate space can also be thought of as that of the lowest level graphical node in the scene graph 103 that contains the viewpoint 122. A graphical node uses the refinement stack to determine the coordinate location and relative size of each of its child graphical nodes within the coordinate space 120 of the current top level graphical node 104, as this is the coordinate space 120 in which the various graphical nodes are rendered with respect to the view volume 130. Accordingly, the current top level graphical node 104 renders its child graphical nodes, which in turn renders their own children, passing them the refinement stack modified to account for each child's graphical instance data 106 and so on down the hierarchy. The recursion is terminated at either a fixed number of levels, or when the resulting imaged size of a child graphical node 104 on the computer display would be smaller than a threshold size, such as 4 by 4 pixels, or when a time limit is reached, or some combination of these or other parameters.

Figure 13:
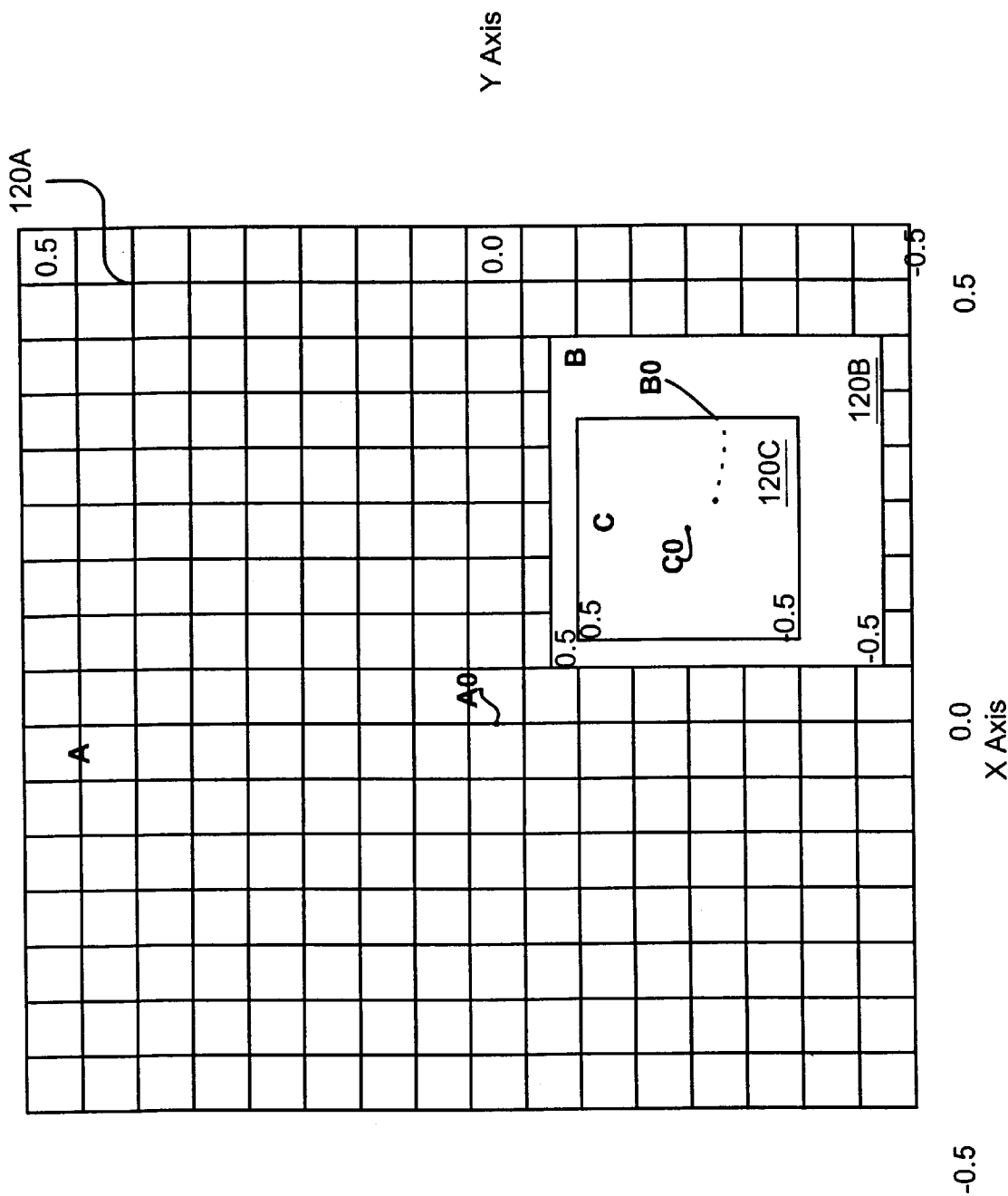
FIG. 13 is an illustration of the rendering of the size of graphical nodes in nested coordinate spaces.

FIG. 13 illustrates an example of the determination of the coordinate location and scale value of a graphical node within successive coordinate spaces 120. In FIG. 13, a current top level graphical node A contains child node B, which in turn contains child node C. Graphical node B has a scale value of $3/8$ or 0.375 and is anchored at $B_0$ with coordinate location ($1/4$, $-1/4$, $1/2$) or (0.25, −0.25, 0.5) within A, and C has a scale value of $2/3$ or 0.66667, and is anchored at $C_0$ with coordinate location ($-1/12$, $1/12$, $2/3$) or (−0.08333, 0.08333, 0.66667) within B. Note that other instances of those same nodes may additionally have other position and scale instance data 106 within other graphical nodes. To render graphical node C, graphical node A passes in the refinement stack containing the scale value and coordinate location of graphical node B to graphical node B. Graphical node B then determines graphical node C's coordinate location within A as ($1/4 - 3/8 * 1/12$, $-1/4 + 3/8 * 1/12$, $1/2 - 3/8 * (1\,2/3)$) or (0.2188, −0.2188, 0.375) and with a scale value of ($3/8 * 2/3$) or 0.25 within A, or $1/4$ the size of A's coordinate space 120A in each dimension.

Finally, each graphical node 104 is responsible for selecting which ones of the graphical nodes 104 within its coordinate space are to be displayed, based on the current view volume 130 and other factors such as the number of levels of hierarchy to be displayed; the time required to render, or the amount of data associated with each child graphical node; the types of semantic containment relationships of the corresponding information nodes; or the types of data items represented by corresponding graphical nodes. The graphical node 104 traverses its list of child graphical nodes local to its coordinate space 120 and for each one passes the node's bounds to the viewer module 219, which tests whether the volume of the node intersects the view volume 130.

The viewer module 219 stores the representation of the view volume 130, including its relative location and size within the current coordinate space 120. The viewer module 219 also translates coordinate locations local to graphical nodes 104 into the coordinate system of the current top level graphical node, and determines whether such coordinate locations intersect the view volume 130.

Finally, the viewer module 219 stores the location of the viewpoint 122, and updates this location in response to user input. The viewer module 219 also stores a description of the display surface, such as the number of horizontal and vertical pixels and can resolve differences between those pixel dimensions and the dimensions of the view volume 130.

The viewer module 219 provides three basic operations. First, the viewer module 219 is responsible for moving the viewpoint 122 in response to user input while constraining it according to the boundaries of the current coordinate space 120.

Second, the viewer module 219 maps the relative coordinates for all graphical nodes 104 within the current coordinate space 120 into display coordinates, providing a transformation from the 3D coordinate spaces 120 onto the 2D coordinate space of the display surface. Generally, the viewer module 219 receives from the current top level graphical node 104 the coordinate location and scale value of each of the graphical nodes within that current coordinate space 120, and determines for each one its absolute display coordinates for final rendering. For rendering text in accordance with its position in a coordinate space 120 using a display system that only supports fixed font sizes, the viewer module 219 determines the appropriate text font size based on the coordinate location and scale value, and the screen location at which the text is to be rendered. The actual rendering of text or graphics is provided by a graphics rendering engine, such as the Graphics Device Interface (GDI) in Microsoft Corp.'s Windows operating system.

Finally, the viewer module 219 is responsible for smoothly interpolating and animating the motion of the viewpoint 122 as it moves from one point to another in response to user input. The viewer module 219 may linearly interpolate the viewpoint movement, or non-linearly, as described above, in response to the depth of the viewpoint 122 in the current coordinate space 120 so that the speed of the viewpoint 122 is proportional to the distance of the viewpoint 122 from the rear plane of the current coordinate space 120.

The above system elements support the various navigation methods described above, including navigation within the current coordinate space 120, and navigation from the current coordinate space 120 into the coordinate space of either a parent or a child graphical node 104.

Generally navigation both within and between coordinate spaces 120 occurs as follows: The viewer module 219 receives user input from an input device moving the viewpoint 122 to a new coordinate location within the current coordinate space 120. The viewer module 219 determines whether the new coordinate location of the viewpoint 122 is within the coordinate space 120 of a child graphical node. If so and the path of the viewpoint 122 has entered that child coordinate space 120 from the front, the viewer module 219 selects the child graphical node to be the current graphical node, and the coordinate space 120 of the child graphical node to be the current coordinate space. The viewer module 219 determines the location of the viewpoint 122 as it would be in the new current coordinate space of the new current graphical node 104. The viewer module 219 then causes the new current graphical node 104 to display its child graphical nodes 104 within its new top level coordinate space 120.

If the viewpoint 122 was moving backwards and exited the current coordinate space 120 from the front (i.e. at Z=1.0), and the current top level graphical node 104 has an immediate parent (i.e. the viewpoint 122 had previously entered the current top level graphical node 104 from one of its parent graphical nodes 104), then the current top level graphical node 104 reverts back to that node, and the viewpoint 122 is likewise computed and set to its equivalent location within that parent's coordinate space 120.

In all cases where the viewpoint 122 changes, the viewer module 219 re-computes its new current view volume 130 within the (possibly changed) current top level coordinate space 120, and invokes each selected child graphical node 104 of the (possibly changed) current top level graphical node 104 to display itself relative to that new view volume 130.

What is claimed is:

1. A computer implemented system for representing and navigating a 3D graphical environment on a display surface, comprising:

a plurality of graphical nodes, each graphical node having a graphical representation and its own bounded volume with a relative 3D coordinate space defined by local X, Y, and Z coordinate extents; selected ones of the graphical nodes being parent graphical nodes having a navigable link to at least one child graphical node; each child graphical node having a coordinate location in the 3D coordinate space of each one of its parent graphical nodes and a scale value defining a relative size of the child graphical node in the volume of the coordinate space of each parent graphical node;

a viewer module that:

stores a view volume anchored at a user movable viewpoint within the coordinate space of a current, selected graphical node, the viewpoint having a depth on a depth axis of the coordinate space of the current, selected graphical node, the viewpoint movable within the coordinate space of the current, selected graphical node, and between the coordinate spaces of different graphical nodes;

dynamically modifies the view volume in response and in proportion to a movement of the viewpoint along the depth axis of the current, selected graphical node by decreasing the view volume in response to an increased depth of the viewpoint, and by increasing the view volume in response to a decreased depth of the viewpoint;

selects the child graphical nodes of the current, selected graphical node having coordinate extents intersecting the view volume within the current, selected graphical node; and displays the selected child graphical nodes on the display surface at a size and surface location determined as a function of the scale and coordinate location of the child graphical node relative to the view volume.

2. The system of claim 1 wherein a rate of change in the location of the viewpoint in the coordinate space of the current, selected graphical node is proportional to a distance of the viewpoint from a rear plane of the coordinate space of the current, selected graphical node.

3. The system of claim 1 wherein an orientation of the view volume is axially aligned with the coordinate space of the current, selected graphical node, and a display of the view volume is projected around a vector restricted to be parallel to the depth axis of the current, selected graphical node.

4. The system of claim 1, wherein the bounded volume of each graphical node is a unit volume.

5. The system of claim 1, wherein the bounded volume of each graphical node is a non-unit volume defined by unequal ranges along each of the X, Y, and Z coordinate axes of its 3D coordinate space.

6. The system of claim 1, wherein each graphical node is displayed by a graphical form having a dimension that is the same as a dimension of a front surface of the bounded volume of the graphical node.

7. The system of claim 1, wherein the viewer module displays the selected graphical nodes using perspective projection in a truncated pyramidal view volume.

8. The system of claim 1, wherein the graphical representation of a graphical node is defined within a volume having a front surface, and movement of the viewpoint into or out of a 3D coordinate space of a graphical node is restricted to movement through the front surface of the volume.

9. A computer implemented system for graphically representing and navigating a graph structured information space including a plurality of information nodes representing items of information, the system comprising:

a plurality of graphical nodes, each graphical node including an association with an information node to graphically represent the information node, and a bounded, relative, locally defined volume having a depth along a depth axis within the locally defined volume, and a rear plane perpendicular to the depth axis; and a viewer module that displays a portion of the volume of a current graphical node visible from a user controllable viewpoint within the volume of a current, selected graphical node, the user controllable viewpoint responsive to user inputs to move the viewpoint within the volume of the current, selected graphical node, or between the volumes of different graphical nodes, the viewer module dynamically modifying the displayed portion in proportion to a distance of the viewpoint along the depth axis from the rear plane of the volume of the current, selected graphical node by increasing the displayed portion as the distance of the viewpoint from the rear plane of the current, selected graphical node increases, and by decreasing the displayed portion as the distance of the viewpoint from the rear plane of the volume of the current, selected graphical node decreases.

10. The system of claim 9, wherein:

the viewer module increases or decreases a displayed size of each graphical node in a volume of the current, selected graphical node in inverse proportion to the size of the displayed volume of the current, selected graphical node.

11. The system of claim 9, wherein a rate of change in the location of the viewpoint within a bounded volume is proportional to a distance of the viewpoint from a rear plane of the bounded volume.

12. The system of claim 9, wherein an orientation of the view volume is axially aligned with the bounded volume of the current, selected graphical node, and a display of the view volume is projected around a vector restricted to be parallel to the depth axis of the current, selected graphical node.

13. The system of claim 9, wherein the bounded volume of each graphical node is a unit volume.

14. The system of claim 9, wherein the bounded volume of each graphical node is a non-unit volume.

15. The system of claim 9, wherein the viewer module displays the graphical nodes intersecting the view volume using perspective projection and a truncated pyramidal view volume.

16. A system for representing and navigating a 3D information space, comprising:
    an information graph comprised of a plurality of information nodes, each information node representing an item of information, and associated with zero or more child information nodes;
    a scene graph comprised of a plurality of graphical nodes, each graphical node for graphically representing an information node of the information graph, each graphical node including:
        an association with an information node of the information graph;
        a bounded, right-rectangular, axially-aligned volume defined in a relative 3D coordinate space;
        associations to zero or more child graphical nodes arranged in that volume;
        for each child graphical node:
            a 3D coordinate location in the relative 3D coordinate space of its parent graphical node; and
            a scale value defining a size of the graphical representation of the child graphical node relative to the 3D coordinate space of its parent graphical node; and
    a viewer module having:
        a selected current graphical node;
        a view volume inversely proportional to a current depth of a viewpoint along an axis in the 3D coordinate space of the selected current graphical node, the view volume intersecting the volume of the 3D coordinate space; and
        adapted to display, from the viewpoint, each child graphical node associated with the selected current graphical node that has 3D coordinate extents intersecting the view volume, with a displayed size of each child graphical node determined according to its scale value and location relative to the view volume.

17. A computer implemented method of displaying and navigating a graphical space, comprising:
    storing a plurality of graphical nodes, each graphical node having a relative 3D coordinate space defined by perpendicular X, Y, and Z axes, one of which is a depth axis, and a bounded volume defined within the 3D coordinate space;
    storing for each graphical node contained by another graphical node a coordinate location and scale for that graphical node in the coordinate space of the other graphical node;
    determining a view volume as a function of an (X, Y, Z) location of a current viewpoint in the 3D coordinate space of a current one of the graphical nodes, and being inversely proportional to the locations of the current viewpoint on the depth axis of the current graphical node;
    determining selected ones of the graphical nodes having 3D coordinate extents intersecting the view volume within the current graphical node; and
    displaying each of the selected ones of the graphical nodes on a display surface at a size and position determined as a function of the scale and location of the graphical node within the view volume of the current graphical node.

18. The method of claim 17 further comprising:
    receiving user inputs describing a change to a location of the viewpoint to produce a new viewpoint within the current graphical node;
    modifying a position of the view volume as a function of the new viewpoint to create a modified view volume;
    determining the selected ones of the graphical nodes within the current graphical node having 3D coordinate extents intersecting the modified view volume; and
    displaying each of the selected ones of the graphical nodes as a function of the scale and location of the graphical nodes within the modified view volume, wherein an increase in the depth of the viewpoint within the current graphical node produces an increased displayed size of each displayed graphical node, and a decrease in the depth of the viewpoint within the current graphical node produces a decreased displayed size of each displayed graphical node.

19. The method of claim 17, further comprising:
    receiving user inputs describing a change to a location of the viewpoint to produce a new viewpoint; and
    determining a rate of change of the location of the viewpoint as proportional to a distance of the viewpoint from a rear plane of the bounded volume of a current graphical node.

20. The method of claim 17, further comprising:
    displaying the selected graphical nodes using a perspective projection and a truncated pyramidal view volume.

21. A computer implemented system for representing and navigating a 3D graphical environment on a display surface, comprising:
    a plurality of information nodes, each information node representing an item of information, and containing zero or more child information nodes;
    a plurality of graphical nodes, each graphical node having a graphical representation of, and association with, one of the information nodes, the graphical representation defined within a bounded volume of a relative 3D coordinate space;
    each parent graphical node having a navigable link to at least one child graphical node; and
    each child graphical node having a size and coordinate location in the bounded volume of each of its parent graphical nodes;
    a viewer module that:
        stores a representation of a view volume anchored at a viewpoint within the volume of a current graphical node;
        dynamically determines the current graphical node and the view volume in response to user inputs describing changes in a location of the viewpoint;
        selects the child graphical nodes of the current graphical node that have 3D coordinate extents intersecting the view volume; and
        displays the selected child graphical nodes on the display surface.

* * * * *